Patented Dec. 4, 1923.

1,476,283

UNITED STATES PATENT OFFICE.

IVAR WALFRID CEDERBERG, OF LIDINGO-BREVIK, NEAR STOCKHOLM, SWEDEN, ASSIGNOR TO NORSK HYDRO-ELEKTRISK KVAELSTOFAKTIESELSKAB, OF CHRISTIANIA, NORWAY.

PROCESS FOR THE MANUFACTURE OF AMMONIA.

No Drawing.   Application filed March 3, 1921. Serial No. 449,553.

*To all whom it may concern:*

Be it known that I, IVAR WALFRID CEDERBERG, a subject of the King of Sweden, residing at Lidingo-Brevik, near Stockholm, in the Kingdom of Sweden, have invented certain new and useful Improvements in Processes for the Manufacture of Ammonia; and I do hereby declare the following to be a full, clear, and exact description of the invention, such as will enable others skilled in the art to which it appertains to make and use the same.

It is known that in the synthetical preparation of ammonia with the use of a contact substance or catalyst such as iron and other heavy metals, that the oxides, hydrates, salts and other compounds of the metals of the alkalies and alkaline earths cause a considerable increase in the catalytic action.

I have now discovered that among the above mentioned promoters the cyanides of alkaline metals and alkaline earth metals particularly distinguish themselves by a specially great increase in the output when the contact-substances used are iron, nickel, cobalt, chromium or manganese. The active influence of these cyanides surpasses many times that of the other salts. This fact is proved by the circumstance that, for instance carbonate of potassium to which iron powder is added hardly produces perceptible quantities of ammonia at a pressure of 80 atmospheres and 375° centigrade, whilst under the same conditions one obtains, when using cyanide of potassium as a promoter, a very good and incessant yield of ammonia.

One condition for obtaining good results is that the oxygen compounds of the above mentioned metals are not present either before or after the catalysis.

I claim—

The process of synthesizing ammonia from its elements, under pressure, which comprises passing a mixture of nitrogen and hydrogen under heat and pressure in contact with a catalyst consisting of a metal of the iron group, and a promoter consisting of a cyanide of an alkalineous metal, said catalyst not including the decomposition product of a complex cyanide of iron and an alkalineous metal.

In testimony that I claim the foregoing as my invention, I have signed my name in presence of two subscribing witnesses.

IVAR WALFRID CEDERBERG.

Witnesses:
 S. SWENSSON,
 WILLIAM L. PEEK.